United States Patent
Choi et al.

(10) Patent No.: US 9,618,688 B2
(45) Date of Patent: Apr. 11, 2017

(54) DISPLAY DEVICE

(71) Applicant: Samsung Display Co., Ltd., Yongin (KR)

(72) Inventors: MinJun Choi, Daejeon (KR);
KyoungDuck Kim, Cheonan-si (KR);
Daljung Kwon, Seoul (KR);
Haengwon Park, Seongnam-si (KR);
HyeonSeok Bae, Suwon-si (KR);
Duckyong Ahn, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 99 days.

(21) Appl. No.: 14/600,803

(22) Filed: Jan. 20, 2015

(65) Prior Publication Data
US 2015/0331178 A1    Nov. 19, 2015

(30) Foreign Application Priority Data
May 14, 2014    (KR) ........................ 10-2014-0057868

(51) Int. Cl.
*H05K 7/00*    (2006.01)
*F21V 8/00*    (2006.01)
*G02F 1/1335*   (2006.01)

(52) U.S. Cl.
CPC ......... *G02B 6/0083* (2013.01); *G02B 6/0088* (2013.01); *G02F 1/133608* (2013.01); *G02F 2201/46* (2013.01); *G02F 2201/50* (2013.01)

(58) Field of Classification Search
USPC ............ 361/679.01, 679.61, 679.58, 679.02, 361/679.21, 728–732, 807, 809, 810
See application file for complete search history.

(56) References Cited

U.S. PATENT DOCUMENTS

| | | | |
|---|---|---|---|
| 6,282,101 B1 | 8/2001 | Hanas et al. | |
| 6,997,722 B2 | 2/2006 | Mangold | |
| 7,282,842 B2* | 10/2007 | Kim .................. | H05K 7/20963 313/46 |
| 7,545,632 B2* | 6/2009 | Cho ........................ | H05K 5/02 361/679.27 |
| 7,633,576 B2 | 12/2009 | Byun | |
| 7,663,870 B2* | 2/2010 | Choi ....................... | H04N 5/64 349/58 |
| 7,778,676 B2 | 8/2010 | Keski-Opas | |

(Continued)

FOREIGN PATENT DOCUMENTS

| | | |
|---|---|---|
| JP | 2002116701 | 4/2002 |
| JP | 2006235303 | 9/2006 |

(Continued)

*Primary Examiner* — Hung S Bui
(74) *Attorney, Agent, or Firm* — H.C. Park & Associates, PLC

(57) ABSTRACT

A display device including a display panel, a backlight assembly to provide light to the display panel, a bottom chassis to accommodate the backlight assembly, a shield chassis connected to the bottom chassis, an insulation tape disposed between the shield chassis and the bottom chassis, the insulation tape including a bolt having grooves defined therein, and a bolt extending through the bolt area and coupling the shield chassis to the bottom chassis. The bolt area is separated into portions at the grooves by the bolt, such that the portions of the bolt area electrically insulate the bolt from the bottom chassis.

11 Claims, 4 Drawing Sheets

(56) References Cited

U.S. PATENT DOCUMENTS

| | | | |
|---|---|---|---|
| 7,800,730 B2 | 9/2010 | Kang et al. | |
| 7,956,975 B2 | 6/2011 | Choi | |
| 7,982,843 B2* | 7/2011 | Isono | H05K 9/0054 349/150 |
| 8,040,454 B2* | 10/2011 | Lee | G02F 1/133308 349/58 |
| 8,704,974 B2* | 4/2014 | Noh | G02B 6/0085 349/58 |
| 2004/0114372 A1* | 6/2004 | Han | G02F 1/133604 362/330 |
| 2006/0007638 A1* | 1/2006 | Fujiyama | H01G 4/40 361/502 |
| 2008/0232134 A1* | 9/2008 | Weng | G02B 6/009 362/612 |
| 2009/0231238 A1 | 9/2009 | Fusayasu et al. | |
| 2012/0327328 A1* | 12/2012 | Kim | G02F 1/133308 349/59 |
| 2013/0169890 A1* | 7/2013 | Kuromizu | G02F 1/13452 348/790 |
| 2014/0152940 A1* | 6/2014 | Wang | G02B 6/0011 349/62 |
| 2014/0169033 A1* | 6/2014 | Yu | H05K 7/20409 362/611 |

FOREIGN PATENT DOCUMENTS

| | | |
|---|---|---|
| JP | 2007025626 | 2/2007 |
| JP | 2012027203 | 2/2012 |
| JP | 2012237783 | 12/2012 |
| JP | 2013174705 | 9/2013 |
| KR | 1020050064386 | 6/2005 |
| KR | 1020060081102 | 7/2006 |

* cited by examiner

DISPLAY DEVICE

CROSS-REFERENCE TO RELATED APPLICATION

This application claims priority from and the benefit of Korean Patent Application No. 10-2014-0057868, filed on May 14, 2014, which is hereby incorporated by reference for all purposes as if fully set forth herein.

BACKGROUND

Field

Exemplary embodiments relate to a display device, and more particularly, to a display device configured to prevent damage from occurring due to electrostatic discharge (ESD) generated during its operation.

Discussion of the Background

In general, a display device includes a display panel and a driving unit to generate a control signal for controlling the driving of the display panel. The driving unit includes a driving circuit board and a flexible printed circuit board. Here, a connector connected to a power cable and a plurality of circuit components for generating a control signal are disposed on the driving circuit board. The flexible printed circuit board is electrically coupled to the driving circuit board and the display panel to transmit the control signal from the driving circuit board to the display panel. The flexible printed circuit board is coupled to the driving circuit board and the display panel in a bent state, to reduce the size of the display device.

The display device receives an external input signal that is needed to display an image. In this case, the display device is electrically coupled to electronic devices for outputting the input signal. Also, electromagnetic interference (EMI) causing noise in the image may be generated while the display device receives the input signal. As a result, the display quality of the display device may be reduced. Also, electrostatic discharge (ESD) generated in the periphery of the display device may cause breakdown and degradation of electronic elements provided in the display device.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device that is configured to resist damage due to electrostatic discharge (ESD).

Additional aspects will be set forth in the detailed description which follows, and, in part, will be apparent from the disclosure, or may be learned by practice of the inventive concept.

Embodiments of the present invention provide display devices including: a display panel to display an image; a backlight assembly to provide light to the display panel; a bottom chassis accommodating the backlight assembly; a shield chassis connected to the bottom chassis; an insulation tape disposed between the bottom chassis and the shield chassis, the insulating tape including a bolt area having grooves; and a bolt coupling the shield chassis to the bottom chassis. The bolt area is separated into portions at the grooves by the bolt, such that the portions of the bolt area electrically insulate the bolt from the bottom chassis.

In other embodiments of the present invention, display devices includes: a display panel to display an image; a backlight assembly to provide light to the display panel; a bottom chassis accommodating the backlight assembly; a shield chassis connected to the bottom chassis; a first insulation tape disposed between the shield chassis and the bottom chassis; a bolt inserted to couple the shield chassis to the bottom chassis; and a washer disposed around the bolt and between the shield chassis and the bottom chassis.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF ILLUSTRATED EMBODIMENTS

Figure 1:
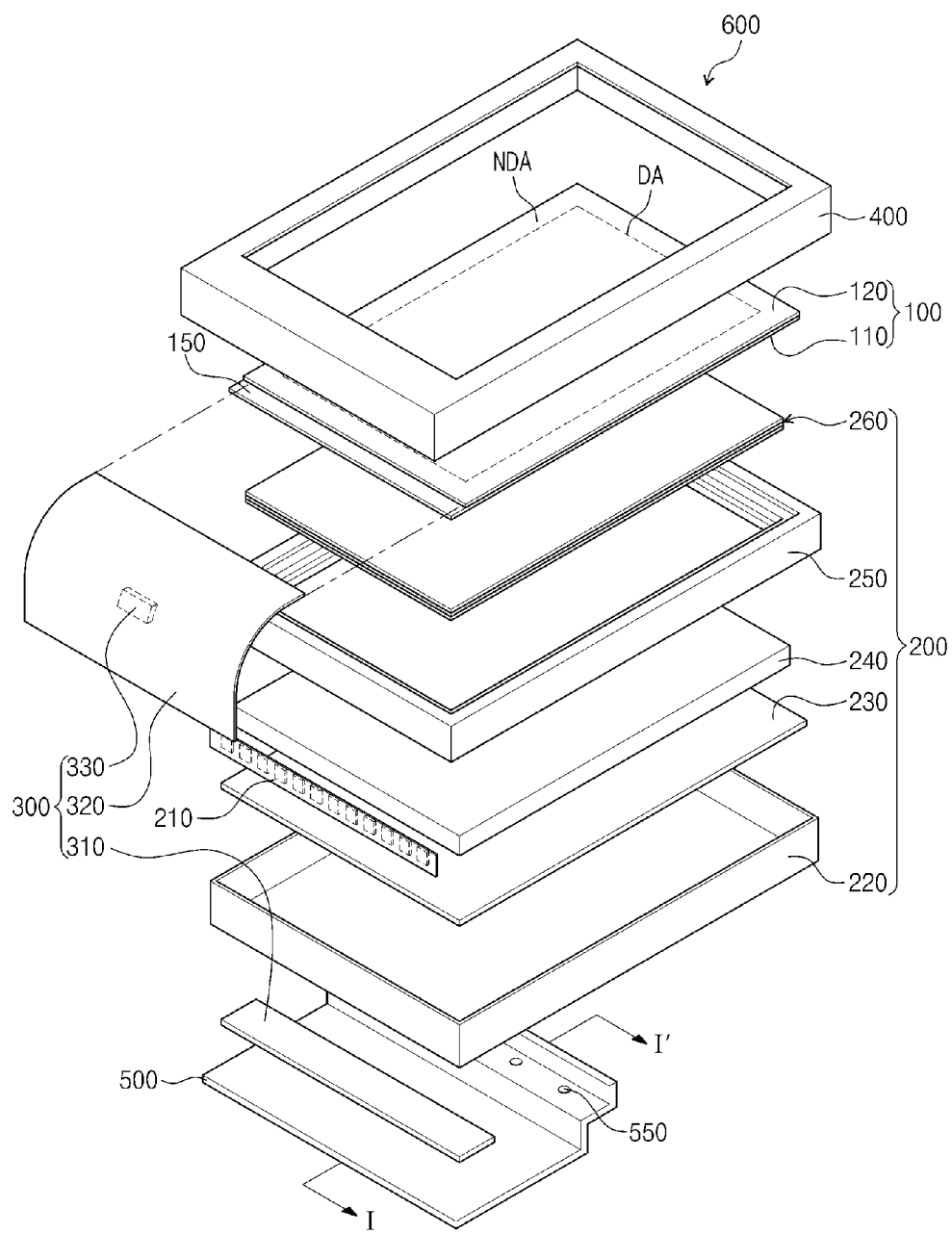
FIG. 1 is an exploded perspective view of a display apparatus according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is an exploded perspective view of a display apparatus 600 according to an exemplary embodiment of the present invention. Referring to FIG. 1, the display device 600 includes a display panel 100, a backlight assembly 200, a driving unit 300, a top chassis 400, and a shield chassis 500.

The display panel 100 includes a display area DA through which an image is displayed, and a non-display area NDA on which driving components are installed. The display panel 100 receives light emitted from the backlight assembly 200 to display the image through the display area DA using the received light. According to an exemplary embodiment of the present invention, the display panel 100 may be realized as a liquid crystal display (LCD) panel. The display panel 100 may include a first substrate 110 having a plurality of pixel electrodes (not shown), a second substrate 120 having a common electrode (not shown) opposing the pixel electrodes, and a liquid crystal layer (not shown) disposed between the first substrate 110 and the second substrate 120.

Although the LCD panel is provided as the display panel 100, the present invention is not limited thereto. For example, the display panel 100 may include an organic electro luminescence display (OLED) panel, an electrowetting display panel, or a nano-crystal display panel. When the display panel 100 is an OLED panel, the backlight assembly 200 may be omitted from the display device 600, because the OLED panel is self-emissive.

The backlight assembly 200 includes a light emitting unit 210, a bottom chassis 220, a reflection plate 230, a light guide plate 240, a mold frame 250, and a plurality of sheets 260.

The light emitting unit 210 generates the light. Although the light emitting unit 210 is shown as being disposed adjacent to one of the side surfaces of the light guide plate 240, the present invention is not limited thereto. For example, other light emitting units 210 may be disposed adjacent to other side surfaces of the light guide plate 240.

The bottom chassis 220 includes a bottom and a plurality of sidewalls extending from the bottom to provide an accommodation space for accommodating components constituting the backlight assembly 200. According to an exemplary embodiment of the present invention, the reflection plate 230, the light guide plate 240, and the sheets 260 may be successively accommodated from a bottom of the bottom chassis 220, in the accommodation space. Although the bottom chassis 220 is provided in the backlight assembly 200, the present invention is not limited thereto. That is, the bottom chassis 220 may accommodate the backlight assembly 200 including the reflection plate 230, the light guide plate 240, and the sheets 260.

The light guide plate 240 receives the light generated from the light emitting unit 210 to guide the light toward the display panel 100. In detail, as described above, the light may be incident into the light guide plate 240, and then the incident light may be provided toward the display panel 100.

The mold frame 250 may be disposed on the bottom chassis 220 and then be coupled to the bottom chassis 220.

In this case, the sheets 260 and the display panel 100 may be disposed on the mold frame 250.

The sheets 260 are disposed between the display panel 100 and the light guide plate 240. The sheets 260 may include optical sheets for adjusting a path of the light that is emitted from the light guide plate 240 and then emitted to the display panel 100.

The driving unit 300 is electrically connected to a pad 150 of the display panel 100 to provide a control signal for controlling an operation of the display panel 100 to the display panel 100. The driving unit 300 may include a driving circuit board 310, a flexible printed circuit board 320, and a driving chip 330.

The driving circuit board 310 may include a timing controller (not shown) or may be electrically connected to the other printed circuit board on which the timing controller is mounted. The driving circuit board 310 receives power from the outside to generate the control signal. The driving circuit board 310 transmits the generated control signal to the driving chip 330 through the flexible printed circuit board 320.

The flexible printed circuit board 320 is electrically coupled to the driving circuit board 310 and the display panel 100. The flexible printed circuit board 320 transmits the control signal from the driving circuit board 310 toward the display panel 100. The flexible printed circuit board 320 may include a base film and wires for transmitting the control signal from the driving circuit board 310 to the display panel 100. For example, the wires may be disposed on the base film. The base film may have flexibility, like a plastic film. Thus, the flexible printed circuit board 320 may be bent in a direction where an external force is applied.

The driving chip 330 may be mounted on the flexible printed circuit board 320. The driving chip 330 may generate data voltages for driving pixels disposed on the display panel 100 in response to the control signal transmitted from the driving circuit board 310.

The top chassis 400 is disposed on the display panel 100 to cover an edge of the display panel 100 except for the display area DA, i.e., the non-display area NDA. An opening for exposing the display area DA in which the image is displayed may be defined in the top chassis 400. Also, the top chassis 400 may be coupled to the shield chassis 500. That is, the top chassis 400 provides an accommodation space for accommodating the display panel 100, the backlight assembly 200, and the driving unit 300, together with the shield chassis 500.

The shield chassis 500 may be disposed under the bottom chassis 220 and then coupled to the top chassis 400. Also, one portion of the shield chassis 500 may be stepped, so as to support a lower portion of the bottom chassis 220. Also, the shield chassis 500 may include a plurality of holes 550 through which the shield chassis 500 is coupled to the bottom chassis 220. According to an embodiment of the present invention, an insulation tape may be mounted on the shield chassis 500 to prevent an electrostatic discharge (ESD) from being transferred from an external component to the driving unit 300. This will be described with reference to FIG. 2 in detail.

Figure 2:
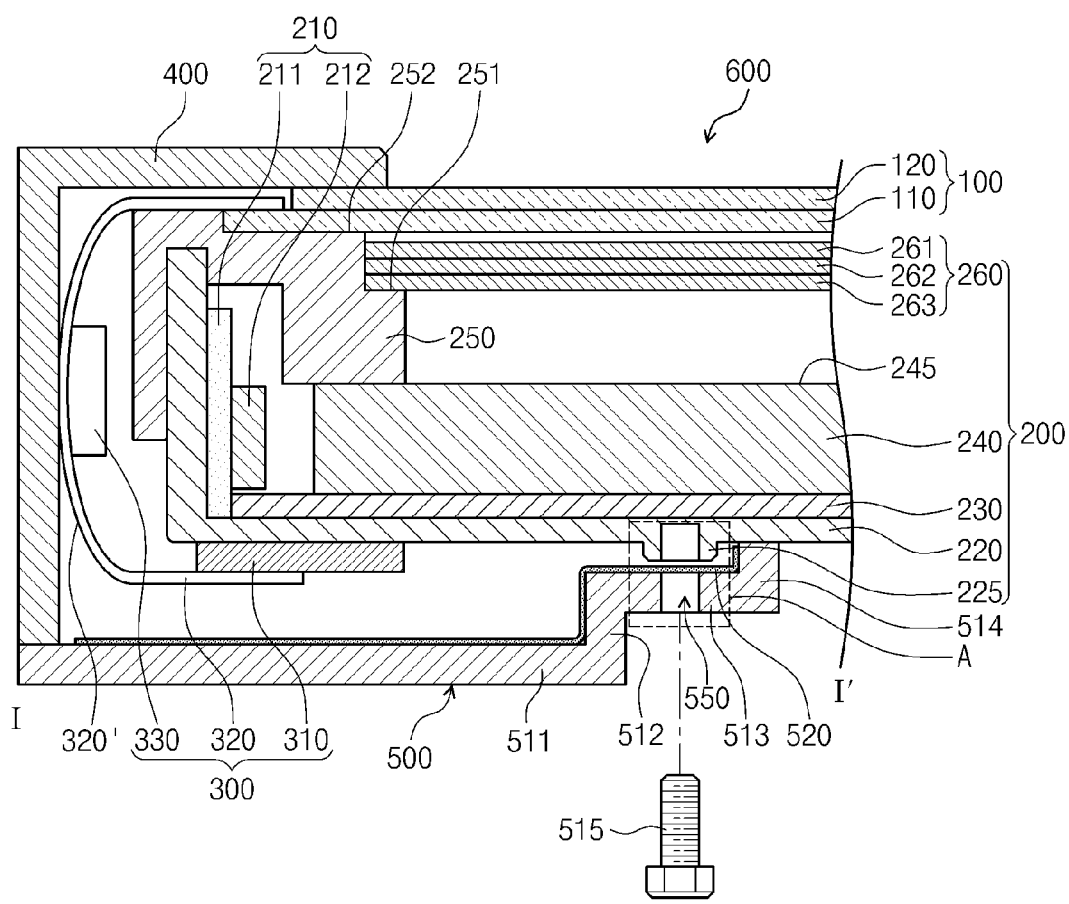
FIG. 2 is a cross-sectional view taken along line I-I' of FIG. 1.

FIG. 2 is a cross-sectional view taken along line I-I' of FIG. 1. Referring to FIG. 2, the display panel 100 is disposed on the backlight assembly 200. The second substrate 120 having the common electrode may be disposed on the first substrate 110 to face the first substrate 110 having the pixel electrodes. As illustrated in FIG. 1, the liquid crystal layer (not shown) may be disposed between the first substrate 110 and the second substrate 120.

The light emitting unit 210 may include the printed circuit board 211 and a plurality of light emitting diodes 212 installed on the printed circuit board 211 to generate the light. The printed circuit board 211 may extend along one side surface of the light guide plate 240. The plurality of light emitting diodes 212 may be mounted on the printed circuit board 211 and arranged in a direction parallel to the one side surface of the light guide plate 240. The light emitting diodes 212 are disposed to face the one side surface of the light guide plate 240. Thus, the light generated from the light emitting diodes 212 may be incident into the one side surface of the light guide plate 240.

The bottom chassis 220 may be disposed under the reflection plate 230 and be coupled to the mold frame 250. Here, the reflection plate 230 may be disposed under the light guide plate 240. According to an exemplary embodiment of the present invention, the bottom chassis 220 may be coupled to the shield chassis 500 by a bolt 515. For this, the bottom chassis 220 may include a connection 225 into which the bolt 515 is inserted. The connection 225 may protrude by a predetermined length from the bottom chassis 220 in a direction where the bolt 515 is inserted. However, the technical idea of the present invention is not limited thereto. That is, the connection 225 may have a predetermined groove in the direction where the bolt 515 is inserted.

After the light is incident into the light guide plate 240, the incident light may be changed in its path by emission patterns (not shown), having an uneven shape, disposed on a rear surface of the light guide plate 240. The light may then be provided toward the display panel 100 through an emission surface 245.

The mold frame 250 is coupled to the bottom chassis 220 to support the edge of the light guide plate 240 by the bottom chassis 220. An inner side of the mold frame 250 may have a stepped portion. The stepped portion includes a first stepped portion 251 and a second stepped portion 252 having a height higher than that of the first stepped portion 251. The sheets 260 are disposed on the first stepped portion 252. The display panel 100 is disposed on the second stepped portion 252. As illustrated in FIG. 2, the height of each of the first stepped portion 251 and the second stepped portion 252 may be set so that the sheets 260 are spaced a predetermined distance from the display panel 100.

However, the present invention is not limited to the structure of the mold frame 250. For example, the sheets 260 may be disposed on the light guide plate 240, and the mold frame 250 may be disposed on the sheets 260 and then coupled to the bottom chassis 220. In this case, the mold frame 250 may allow the light guide plate 240 and the sheets 260 to be supported on bottom chassis 220.

The sheets 260 may be mounted on the first stepped portion 251 of the mold frame 250. The sheets 260 may include a top diffusion sheet 261 and a bottom diffusion sheet 263 to diffuse the light emitted from the light guide plate 240, and a prism sheet 262 to collect the light emitted from the light guide plate 240. The top diffusion sheet 261 is disposed on the prism sheet 262, and the bottom diffusion sheet 263 is disposed under the prism sheet 262.

The driving circuit board 310 is disposed under the bottom chassis 220. The flexible printed circuit board 320 may allow the display panel 100 and the driving circuit board 310 to be electrically connected to each other. Also, the flexible printed circuit board 320 may be bent alongside portions of the display panel 100 and the backlight assembly 200.

The driving chip 330 may be mounted on the flexible printed circuit board 320. The flexible printed circuit board 320 may include a bent portion 320'. The bent portion 320' may be accommodated between the side portion of the backlight assembly 200 and the top chassis 400. The driving chip 330 may be mounted on the bent portion 320' of the flexible printed circuit board 320. According to an exemplary embodiment of the present invention, the driving chip 330 may be mounted on the flexible printed circuit board 320 in a chip on film (COF) manner. However, the present invention is not limited thereto.

The shield chassis 500 may be coupled to the top chassis 210 and the bottom chassis 220. The shield chassis 500 may be disposed under the bottom chassis 220 to protect the driving unit 300. In detail, one end of the shield chassis 500 may be connected to the top chassis 210, and the other end of the shield chassis 500 may be connected to the bottom chassis 220. In particular, the other end of the shield chassis 500 may be stepped and connected to the bottom chassis 220.

In detail, the shield chassis 500 includes a bottom 511, a first extension 512, a second extension 513, and a third extension 514. The bottom 511 extends in parallel with a bottom surface of the bottom chassis 220. One end of the bottom 511 is connected to the top chassis 400, and the other end of the bottom 511 is connected to the third extension 514.

One end of the first extension 512 is connected to the other end of the bottom 511. The first extension 512 extends upward so that an upper end of the first extension 512 is connected to the second extension 513. The second extension 513 does not overlap the bottom 511, but extends in parallel with the bottom 511. One end of the second extension 513 is connected to the one end of the first extension 512, and the other end of the second extension 513 is connected to one end of the third extension 514.

A central portion of the second extension 513 may be referred to as a coupling area A. That is, the coupling area A may be an area in which the bolt 515 is inserted to the second extension 513. For this, the second extension 513 includes a hole 550 formed in the coupling area A and in which the bolt 515 is inserted. The coupling area A may include the insulation tape 520 disposed on the second extension 513. Thus, the bolt 515 is inserted through the hole 515 defined in the second extension 513, and the inserted bolt 515 passes through the insulation tape 520 and then is connected to the connection 225 disposed on the bottom chassis 220. The third extension 514 contacts a predetermined area of the bottom chassis 220.

The ESD may be accumulated in the display device from the external component. Here, the external component may signify, for example, an external electronic device connected to the display device. When the ESD is transmitted to the driving unit 300 in the display device, the electrical characteristics of the ESD may reduce the driving performance of the driving unit 300. For example, the ESD moves to the shield chassis 500 through the top chassis 400. Thereafter, the ESD may be transmitted to the driving unit 300 through the bottom chassis 220 coupled to the shield chassis 500.

According to an exemplary embodiment of the present invention, the insulation tape 520 may be disposed on the shield chassis 500, to prevent the ESD from being transmitted into the driving unit 300. The insulation tape 520 may prevent the ESD from being transmitted from the shield chassis 500 into the bottom chassis 220.

The bolt 515 is connected so that the shield chassis 500 and the bottom chassis 200 are fixed to each other. According to an embodiment of the present invention, as illustrated in FIG. 3, the bolt 515 may be inserted into the hole 550 defined in the second extension 513, pass through the insulation tape 510 disposed on the second extension 513, and then be fixed to the connection 225 of the bottom chassis 220.

Figure 3:
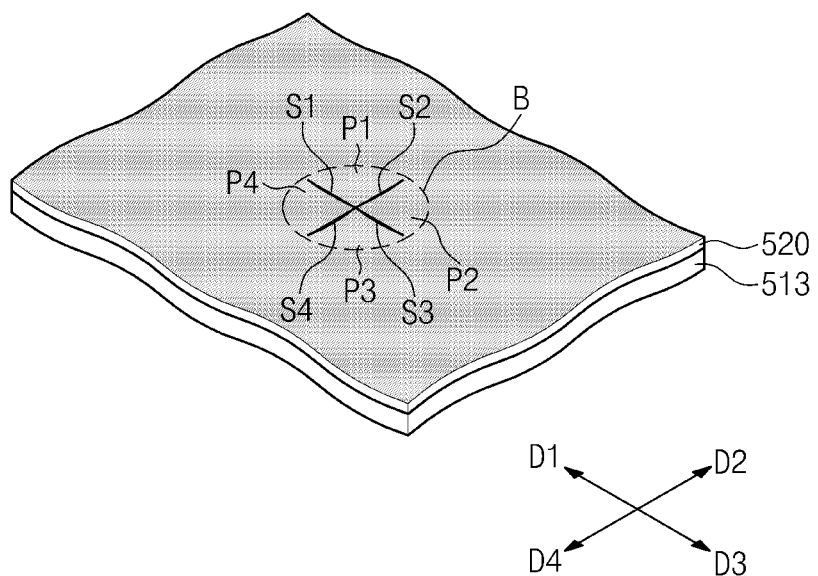
FIG. 3 is a perspective view of an insulation tape and a second extension of FIG. 2, according to an exemplary embodiment of the present invention.

FIG. 3 is a perspective view of an insulation tape and a second extension of FIG. 2 according to an exemplary embodiment of the present invention.

In the related art, a hole having a predetermined size may be defined in each of a shield chassis and an insulation tape disposed on the shield chassis, so as to connect the shield chassis and the bottom chassis to each other with a bolt. The bolt is connected to a lower end of the bottom chassis through the hole in the shield chassis and the insulation tape. However, in this case, ESD may be transmitted from the shield chassis to the bottom chassis through the bolt connecting the shield chassis to the bottom chassis. As a result, the ESD may be transmitted into a driving unit.

According to an exemplary embodiment of the present invention, the second extension 513 and the insulation tape 520 include a bolt area B through which the bolt 515 passes. The bolt area B of the insulation tape 520 may include a plurality of axial lines. Here, each of the axial lines may be grooves or slits configured such that when the bolt 515 passes through the insulation tape 520, the bolt area B is separated into portions at the axial lines.

In detail, referring to FIGS. 2 and 3, the second extension 513 includes the hole 550 corresponding to the bolt area B. The bolt 515 may be inserted through the hole 550 of the second extension 513 to pass through the bolt area B of the insulation tape 520 and then be connected to the connection 225 of the bottom chassis 220.

According to an exemplary embodiment of the present invention, the insulation tape 520 includes a first axial line S1 that extends in a first direction D1, a second axial line S2 that extends in a second direction D2, a third axial line S3 that extends in a third direction D3, and a fourth axial line S4 that extends in a fourth direction D4, with respect to the center of the bolt area B. Here, the first direction D1 and the third direction D3 may be in parallel with and opposite to each other. The second direction D2 and the fourth direction D4 may be in parallel with and opposite to each other. Also, the first and third directions D1 and D3 may cross the second and fourth directions D2 and D4.

The first and third axial lines S1 and S3 may be connected to each other in the first and third directions D1 and D3. The second and fourth axial lines S2 and S4 may be connected to each other in the second and fourth directions D2 and D4. Also, each of the first to fourth axial lines S1 to S4 may be grooves or slits configured such that the bolt passes through the bolt area B by an external pressure.

Also, the bolt area B may include first to fourth portions P1 to P4. Each of the first to fourth portions P1 to P4 may have a fan shape. In detail, the first portion P2 may be a portion between the first and second axial lines S1 and S2. The second portion P2 may be a portion between the second and third axial lines S2 and S3. The third portion P3 may be a portion between the third and fourth axial lines S3 and S4. The fourth portion P4 may be a portion between the fourth and first axial lines S4 and S1.

According to the above description, when the bolt 515 is inserted from a lower end of the second extension 512, the first to fourth portions P1 to P4 of the insulation tape 520 may be bent in an insertion direction of the bolt 515 with respect to the center of the bolt area B. In this case, the bolt 515 passing through the insulation tape 520 may be covered by the first to fourth portions P1 to P4. That is, a side surface of the bolt 515 may be covered by the insulation tape 520.

As a result, the transmission of the ESD into the bottom chassis 220 through the bolt may be prevented.

Figure 4:
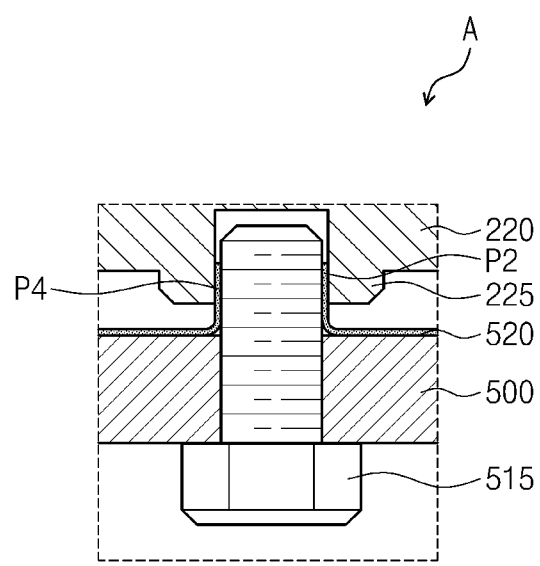
FIG. 4 is an enlarged cross-sectional view of a coupling area of FIG. 2 after a bolt is inserted.

FIG. 4 is an enlarged cross-sectional view of a coupling area of FIG. 2, after the bolt 515 has been inserted, according to an embodiment of the present invention. Referring to FIG. 4, the bolt 515 rotates to move upward and pass through the hole 550 (see FIG. 2) of the shield chassis 500 and the bolt area B of the insulation tape 520 and is then connected to the connection 225 of the bottom chassis 220. In detail, the bolt 515 contacts a lower end of the insulation tape 520 through the hole 550 of the shield chassis 500. Then, the bolt 515 separates the portions P1-P4 of the insulation tape 520, which are then bent in the insertion direction of the bolt 515. That is, the bolt 515 passes through the insulation tape 520 by separating the portions P1-P4. For example, referring to the cross-sectional view of FIG. 4, the second and fourth portions P2 and P4 of the insulation tape 520 may be disposed between the bolt 515 and the bottom chassis 220, as illustrated in FIG. 3. Although not shown in FIG. 3, the first and third portions P1 and P3 may also be disposed between the bolt 515 and the bottom chassis 220, Generally, in the related art, the performance of a driving unit is reduced due to ESD transmitted to a bottom chassis through the side surfaces of a bolt. However, as described above, the insulation tape 520 according to the present invention may cover the side surface of the bolt 515 to prevent the ESD from being transmitted to the bottom chassis 220. Since the side surface of the bolt 515 passing through the insulation tape 520 is covered by the insulation tape 520, the ESD may not be transmitted to the bottom chassis 220 through the bolt 515. As a result, the ESD may not be transmitted to the driving unit (see reference numeral 300 of FIG. 2).

Figure 5:
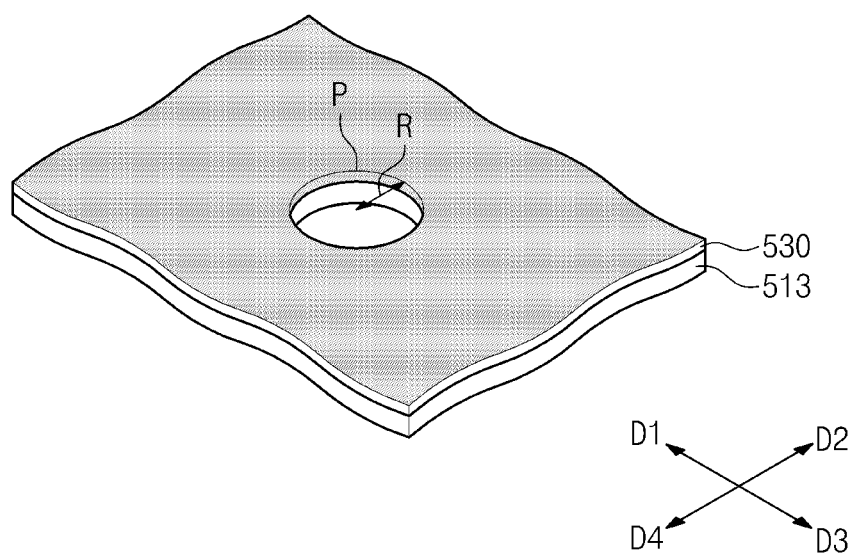
FIG. 5 is a perspective view of an insulation tape and a second extension of FIG. 2 according to another exemplary embodiment of the present invention.
Figure 6:
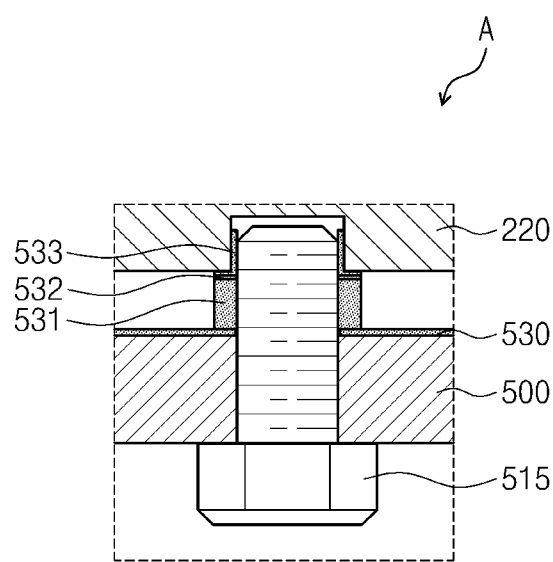
FIG. 6 is an enlarged cross-sectional view of a coupling area of FIG. 2 according to another exemplary embodiment of the present invention.

FIG. 5 is a perspective view of an insulation tape and a second extension of FIG. 2 according to another exemplary embodiment of the present invention. FIG. 6 is an enlarged cross-sectional view of a coupling area of FIG. 2, according to another exemplary embodiment of the present invention.

Referring to FIG. 5, each of the second extension 513 and the first insulation tape 530 disposed on the second extension 513 may have a hole P having a predetermined radius R. That is, the bolt 515 for fixing the second extension 513 and the bottom chassis 220 may be connected to the connection (see reference numeral 225 of FIG. 2) of the bottom chassis 220 from a lower end of the second extension 513, through a first insulation tape 530 disposed on the second extension 513. Similarly, the second extension 513 may have a hole corresponding to a hole P defined in the first insulation tape 530.

As illustrated in FIG. 6, according to another exemplary embodiment of the present invention, the connection of the bottom chassis 220 to which the bolt 515 is coupled may have a groove instead of a protrusion. The bolt 515 may pass through the hole defined in the shield chassis 500 and the hole (see reference symbol P of FIG. 5) defined in the first insulation tape 530 and then may be connected to the bottom chassis 20. According to an exemplary embodiment of the present invention, a washer 531 may be disposed around the bolt 515, between the first insulation tape 530 and the bottom chassis 220. That is, the washer 531 may be inserted through an upper end of the bolt 515 and then disposed on an upper portion of the first insulation tape 530 and the lower portion of the bottom chassis 220.

An adhesive tape 532 may be disposed on the washer 531. Also, a second insulation tape 533 may be disposed on the washer 531. The adhesive tape 532 is disposed on the washer 531 to allow the washer 531 and the second insulation tape 533 to be fixed to each other. The second insulation tape 533 may be disposed to surround the side surface of the bolt 515. That is, the second insulation tape 533 is disposed on the side surface of the bolt 515 to prevent the ESD from being transmitted to the bottom chassis 220. As a result, the transmission of the ESD into the driving unit (see reference numeral 300 of FIG. 2) may be prevented.

According to the embodiments of the present invention, the display device having the improved operating performance may be provided.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device comprising:
a display panel;
a backlight assembly configured to provide light to the display panel;
a bottom chassis accommodating the backlight assembly and the display panel;
a shield chassis disposed under the bottom chassis and connected to the bottom chassis and comprising a hole;
an insulation tape disposed on the shield chassis and comprising a bolt area in which grooves are formed; and
a bolt extending through the bolt area into the hole in the shield chassis to couple the shield chassis to the bottom chassis,
wherein the bolt area is separated into portions at the grooves by insertion of the bolt through the bolt area of the insulation tape, such that the portions of the bolt area are bent in an insertion direction of the bolt to electrically insulate the bolt from the bottom chassis.

2. The display device of claim 1, wherein the backlight assembly comprises:
a light emitting unit configured to generate the light; and
a light guide plate configured to guide the light toward the display panel.

3. The display device of claim 2, further comprising a driving unit electrically connected to the display panel and configured to provide a control signal to the display panel.

4. The display device of claim 3, wherein the driving unit comprises:
a driving circuit board configured to generate the control signal;
a flexible printed circuit board electrically coupled to the driving circuit board and the display panel, and configured to transmit the control signal into the display panel; and
a driving chip mounted on the flexible printed circuit board.

5. The display device of claim 4, wherein the driving circuit board is disposed between the bottom chassis and the shield chassis.

6. The display device of claim 4, wherein the flexible printed circuit board is bent along a side portion of the backlight assembly.

7. The display device of claim 6, wherein the driving chip is disposed on the flexible printed circuit board adjacent to the side portion of the backlight assembly.

8. The display device of claim 1, wherein one end of the shield chassis is stepped.

9. The display device of claim 1, wherein the bolt area comprises four of the portions, each of the portions having substantially the same size.

10. The display device of claim 1, further comprising a top chassis covering an edge of the display panel and comprising an opening exposing a display area of the display panel.

11. A display device comprising:
a display panel;
a backlight assembly configured to provide light to the display panel;
a bottom chassis configured to accommodate the backlight assembly and the display panel;
a shield chassis disposed under the bottom chassis and connected to the bottom chassis;
a first insulation tape disposed between the shield chassis and the bottom chassis;
a bolt configured to couple the shield chassis to the bottom chassis;
a washer disposed around the bolt and between the first insulation tape and the bottom chassis;
an adhesive tape disposed on the washer; and
a second insulation tape disposed on the adhesive tape and between the bolt and the bottom chassis,
wherein each of the shield chassis and the first insulation tape comprises a hole through which the bolt extends, and the second insulation tape surrounds a side surface of the bolt in the hole in the shield chassis such that the second insulation tape electrically insulates the bolt from the bottom chassis.

* * * * *